US011409720B2

(12) United States Patent
Keymolen et al.

(10) Patent No.: US 11,409,720 B2
(45) Date of Patent: Aug. 9, 2022

(54) METADATA REDUCTION IN A DISTRIBUTED STORAGE SYSTEM

(71) Applicant: Western Digital Technologies, Inc., San Jose, CA (US)

(72) Inventors: Bruno Keymolen, Ghent (BE); Wim De Wispelaere, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 330 days.

(21) Appl. No.: 16/681,833

(22) Filed: Nov. 13, 2019

(65) Prior Publication Data

US 2021/0141775 A1 May 13, 2021

(51) Int. Cl.
*G06F 16/215* (2019.01)
*G06F 16/23* (2019.01)
*G06F 16/22* (2019.01)
*G06F 16/27* (2019.01)

(52) U.S. Cl.
CPC ........ *G06F 16/215* (2019.01); *G06F 16/2272* (2019.01); *G06F 16/2365* (2019.01); *G06F 16/27* (2019.01)

(58) Field of Classification Search
CPC .... G06F 16/215; G06F 16/27; G06F 16/2272; G06F 16/2365

USPC .......................................................... 707/655
See application file for complete search history.

(56) References Cited

U.S. PATENT DOCUMENTS

| 9,678,969 | B2 | 6/2017 | Deng et al. | |
|---|---|---|---|---|
| 2004/0210946 | A1 | 10/2004 | Shin | |
| 2013/0226931 | A1* | 8/2013 | Hazel | G06F 16/134 707/741 |
| 2013/0227236 | A1* | 8/2013 | Flynn | G06F 3/061 711/165 |

* cited by examiner

*Primary Examiner* — Robert W Beausoliel, Jr.
*Assistant Examiner* — Arthur Ganger
(74) *Attorney, Agent, or Firm* — Patent Law Works LLP

(57) ABSTRACT

According to an example method, a read request associated with a second data object is received, where the second data object is identifiable by a second object identifier. A second segment index number is determined that would identify a location of the second data object is absent from a metadata index. In response to determining that the second segment index number is absent from the metadata index, an incrementally lower index is selected in the metadata index, where the incrementally lower index is a first segment index number that identifies a location of the first data object. The second data object is retrieved using the first segment index number and a first offset corresponding to the first segment index number.

20 Claims, 8 Drawing Sheets

Disk Metadata Index 134

| Lane_1 ID 122.1 | |
|---|---|
| Segment (Chunk) Index Number 124 | Offset in Lane 126 |
| Segment_1 124.1.1 | Offset_1 126.1.1 |
| Segment_2 124.1.2 | Offset_2 126.1.2 |
| ⋮ | ⋮ |
| Segment_S1 124.1.S1 | Offset_S1 126.1.S1 |

402.1 points to the Lane_1 table above.

⋮

| Lane_L ID 122.L | |
|---|---|
| Segment (Chunk) Index Number 124 | Offset in Lane 126 |
| Segment_1 124.L.1 | Offset_1 126.1.1 |
| Segment_2 124.L.2 | Offset_2 126.1.2 |
| ⋮ | ⋮ |
| Segment_SL 124.L.SL | Offset_SL 126.L.SL |

402.L points to the Lane_L table above.

Figure 4

METADATA REDUCTION IN A DISTRIBUTED STORAGE SYSTEM

TECHNICAL FIELD

The present disclosure generally relates to data storage, and in a more particular example, to management of metadata in data storage systems.

BACKGROUND

The performance of large-scale distributed storage systems to efficiently handle read and write operations in a scalable way depends on an efficient handling of an index which can grow very large. Various approaches, such as caching or storing the index in volatile storage (e.g., random-access memory (RAM)), are commonly considered not feasible in such large-scale storage systems as the size of the index could grow to, for example, over 25 terabytes (TB), which can no longer be readily handled in RAM. Indexes contain metadata which is used to retrieve the actual storage data, and may contain information such as location and length. Traditional systems often store this data at a separate location on media/disk and that metadata is used for data retrieval.

In addition to addressing the storage of indexes, any solutions to the management of such indexes should be aware of any overhead burden placed on the system to address the index sizes. Accordingly, a solution is needed to manage the size of such indexes index while helping to address the challenge of managing the breakneck speed of growth of data.

SUMMARY

The present disclosure describes, among other things, various aspects for accommodating the reduction in size of a metadata index stored in non-volatile storage while still allowing all of the data objects stored in the non-volatile storage areas of a distributed storage system to be retrieved in a timely manner. The present disclosure describes a way to archive single transaction write operations and low instructions per operation rates for read operations, where a majority of read operations may also be executed in a single transaction.

One general aspect includes a method, comprising: receiving a read request in a distributed storage system associated with a second data object stored by the distributed storage system, where the second data object is identifiable by a second object identifier; determining that a second segment index number that would identify a location of the second data object in a storage area of the distributed storage system is absent from a metadata index of the distributed storage system; in response to determining that the second segment index number is absent from the metadata index, selecting an incrementally lower index included in the metadata index, where the incrementally lower index is a first segment index number that identifies a location of a first data object in the storage area of the distributed storage system; and retrieving the second data object from the distributed storage system using the first segment index number and a first offset corresponding to the first segment index number.

Another general aspect includes a distributed storage system, comprising: a request processing module configured to: receive a read request in a distributed storage system associated with a second data object stored by the distributed storage system, where the second data object is identifiable by a second object identifier. The distributed storage system further comprises a metadata index processing module configured to: determine that a second segment index number that would identify a location of the second data object in a storage area of the distributed storage system is absent from a metadata index of the distributed storage system; in response to determining that the second segment index number is absent from the metadata index, select an incrementally lower index included in the metadata index, where the incrementally lower index is a first segment index number that identifies a location of a first data object in the storage area of the distributed storage system; and retrieve the second data object from the distributed storage system using the first segment index number and a first offset corresponding to the first segment index number.

Implementations may include one or more of the following features. The method where the distributed storage system includes the first data object and the second data object identified by a first object identifier and the second object identifier, respectively, and stored in a first segment and a second segment, respectively, of a plurality of segments of an append-only storage area of the distributed storage system. The first and second segments are respectively identified by the first segment index number and the second segment index number of a plurality of segment index numbers are sequentially identifying respective sequential ones of the plurality of segments of the append-only storage area of a distributed storage system. The first segment index number is sequentially less than the second segment index number.

The method where determining further comprises accessing the metadata index of the distributed storage system. The metadata index includes a plurality of offsets associated with the respective plurality of segment index numbers. The metadata index includes the first segment index number identifying a location of the first data object, and excludes the second segment index number identifying a location of the second data object. The method where the retrieving the second data object comprises accessing the distributed storage system using a first offset corresponding to the first segment index number to read a first segment length in a first header of the first data object advancing by the first segment length in the distributed storage system to a second header corresponding to the second segment. In response to the second header including the second segment index number, the method outputs the second data object stored in the second segment of the distributed storage system.

The method where the storage area of the distributed storage system comprises a plurality of lanes, each lane including a plurality of segments of an append-only storage area of the distributed storage system. The plurality of segments in each lane of the plurality of lanes is identified by a respective plurality of segment index numbers sequentially identifying sequential ones of the plurality of segments of the append-only storage area of the distributed storage system. Each of the first data object and the second data object further includes a lane identifier identifying one lane of the plurality of lanes.

The method further comprises storing the first data object and the second data object in a first segment and a second segment, respectively. The method generates a first object identifier and the second object identifier to enable a respective identification of the first data object and the second data object in the distributed storage system. The first object identifier and the second object identifier respectively include a first header and a second header, and the first header and the second header respectively include the first segment index number and the second segment index number. The method generates the metadata index including the first segment index number and the second segment index number respectively associated with the first offset and a second offset. The first offset designates a first distance from a beginning of the storage area to a beginning of the first segment in the storage area, and the second offset designates a second distance from a beginning of the storage area to a beginning of the second segment in the storage area. In response to the metadata index satisfying an excessive metadata index size threshold, the method deletes the second segment index number and the second offset from the metadata index.

The method, where deleting the second segment index number and the second offset from the metadata index comprises at least one of: selecting at least some of the plurality of segment index numbers and offsets to delete based on a selection of one of even or odd numbered segment index numbers. The method selects at least some of the plurality of segment index numbers and offsets to delete based on at least some of the plurality of segment index numbers being indexed to a power of two. The method, where in subsequent iterations where the metadata index again satisfies the excessive metadata index size threshold, deletes one or more of the plurality of segment index numbers. The method where a copy of the metadata index is stored in a metadata storage area of the distributed storage system.

The system where the distributed storage system includes the first data object and the second data object that are identified by a first object identifier and the second object identifier, respectively, and are stored in a first segment and a second segment, respectively, of a plurality of segments of an append-only storage area of the distributed storage system. The first and second segments are respectively identified by the first segment index number and the second segment index number of a plurality of segment index numbers sequentially identify respective sequential ones of the plurality of segments of the append-only storage area of a distributed storage system. The first segment index number is sequentially less than the second segment index number.

The system where the metadata index processing module is further configured to access the metadata index of the distributed storage system. The metadata index includes a plurality of offsets associated with the respective plurality of segment index numbers, includes the first segment index number identifying a location of the first data object, and excludes the second segment index number identifying a location of the second data object. In the system, the storage area of the distributed storage system comprises a plurality of lanes. Each lane of the plurality of lanes includes a plurality of segments of an append-only storage area of the distributed storage system and the plurality of segments in each of the plurality of lanes is identified by a respective plurality of segment index numbers sequentially identifying sequential ones of the plurality of segments of the append-only storage area of the distributed storage system.

The system, where each of the first data object and the second data object further includes a lane identifier identifying one lane of the plurality of lanes. The system where the request processing module is further configured to store the first data object and the second data object in a first segment and a second segment, respectively. The request processing module generates a first object identifier and the second object identifier to enable a respective identification of the first data object and the second data object in the distributed storage system. The first object identifier and the second object identifier respectively include a first header and a second header. The first header and the second header respectively include the first segment index number and the second segment index number. The generated metadata index includes the first segment index number and the second segment index number respectively associated with the first offset and a second offset. The first offset designates a first distance from a beginning of the storage area to a beginning of the first segment in the storage area and the second offset designates a second distance from a beginning of the storage area to a beginning of the second segment in the storage area. The metadata index processing module is further configured to, in response to the metadata index satisfying an excessive metadata index size threshold, delete the second segment index number and the second offset from the metadata index.

The system, where the metadata index processing module is further configured to select at least some of the plurality of segment index numbers and offsets to delete based on selection of at least some of even or odd numbered segment index numbers, and select at least some of the plurality of segment index numbers and offsets to delete based on selection of at least some of the plurality of segment index numbers that are segment index numbers indexed as a power of two. The system, where the metadata index processing module is further configured to, in subsequent iterations where the metadata index again satisfies the excessive metadata index size threshold, delete one or more of the plurality of segment index numbers. The system, where the metadata index processing module is further configured to store a copy of the metadata index in a metadata storage area of the distributed storage system.

Yet another general aspect includes a distributed storage system, comprising: means for receiving a read request in a distributed storage system associated with a second data object stored by distributed storage system, where the second data object is identifiable by a second object identifier; means for determining that a second segment index number that would identify a location of the second data object in a storage area of the distributed storage system is absent from a metadata index of the distributed storage system; means for in response to determining that the second segment index number is absent from the metadata index, selecting an incrementally lower index included in the metadata index, where the incrementally lower index is a first segment index number that identifies a location of a first data object in the storage area of the distributed storage system; and means for retrieving the second data object from the distributed storage system using the first segment index number and a first offset corresponding to the first segment index number.

The disclosure herein provides various advantages and benefits. Many devices may naturally be configured in storage groups or blocks based on specific architectures. For example, non-volatile storage devices may be architected to include erasure blocks which would preferably be considered when storing data. Erasure blocks may be configured to allow erasure only by erasing an entire block of storage cells within the storage device. Accordingly, the lanes described herein may be arranged to be respectful of various storage architectures. Further, various non-volatile storage devices may be implemented using various technologies that exhibit intrinsic characteristics. For example, some non-volatile storage technologies are capable of a limited number of reliable rewrite cycles for each of the storage cells before the performance of the storage cells degrades. Accordingly, the techniques described herein provide a technique for appending additional data in storage areas that are partitioned by specific lanes for the management of rewrites to the storage areas. Yet further, the size of indexes stored both volatilely and non-volatilely are managed to avoid overwhelming available volatile and non-volatile resources. Specifically, the quantity of storage devices utilized just for storing metadata may be significantly reduced by using the dynamic techniques described herein.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

FIG. 4 illustrates the structure of an example disk metadata index.

DETAILED DESCRIPTION

Often, distributed storage systems (DSSs) are used to store large amounts (e.g., terabytes, petabytes, exabytes, etc.) of data, such as objects or files in a distributed and fault-tolerant manner with a predetermined level of redundancy.

Some existing object storage systems store data objects referenced by an object identifier versus file systems. As a result, object storage systems are often selected for large-scale storage systems.

In the storage of data objects, object identifiers may be generated and may be associated with an index number and together stored in a metadata index. In order to solve the problem of ever-increasing entries in the metadata index, there is made use of an anchor store concept which reduces the size of the metadata index in volatile storage or random-access memory. The concept is developed for storage nodes making use of storage devices based on Flash, Shingled Magnetic Recording (SMR), or Perpendicular Magnetic Recording (PMR). One solution is to cache or store the metadata index in RAM but such an approach is not feasible in such large-scale storage systems as the size of the metadata index could grow to for example over 25 TB, which can no longer be handled in RAM.

In operation, a single write operation means that both the storage data and the index/metadata is written to the media before the write completes, which means that at least 2 writes per 2 transactions are needed to store data. According to the disclosure herein, index information may be stored together with the storage-data and, to facilitate fast restarts after shutdown, a separate index (e.g., an "anchor log") may optionally be maintained on disk to accelerate the speed of restarting a system. Also, due to aspects where a successful write operation includes both index and storage-data written in one write/transaction, a higher write-throughput may occur with respect to traditional file systems, resulting in a higher number of transactions per second. Additionally, organizing data into larger sequential writes is suitable for physical storage devices, such as Shingled Magnetic Recording (SMR) and flash memory such as Zoned NameSpace (ZNS) storage.

Figure 1:
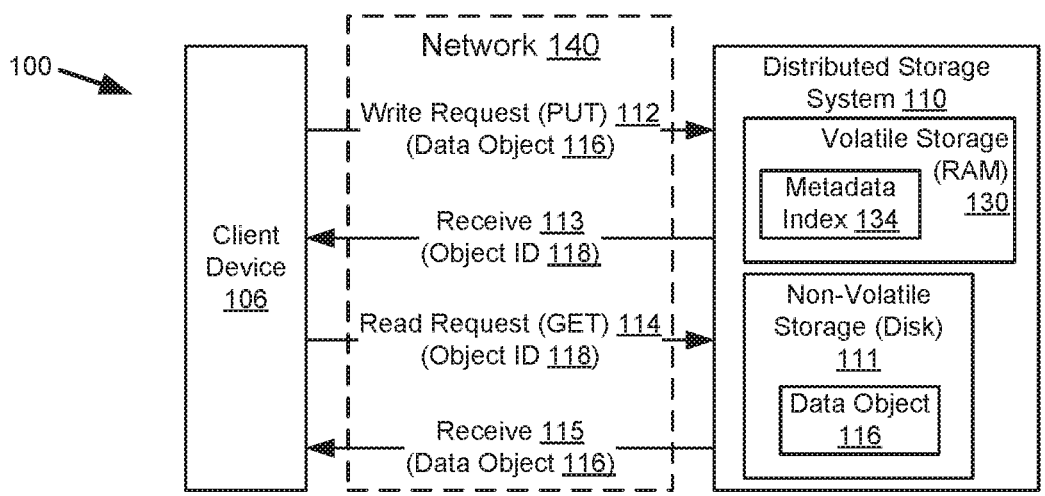
FIG. 1 illustrates example storage and retrieval of data in a distributed storage system.

FIG. 1 illustrates the storage and retrieval of a set of data (also referred to as a "chunk" or merely "data") in a distributed storage system (DSS). A data storage process illustrated with respect to system 100 occurs between a client device 106 and a distributed storage system 110. In a distributed storage system, a PUT or write request operation 112 sends data object 116 to the distributed storage system 110 for storage. The distributed storage system 110 returns an object identifier (ID) 118 in a response operation 113. Similarly, in a GET or read request operation 114, client device 106 sends the object identifier (ID) 118 to the distributed storage system 110. In a response operation 115, the distributed storage system 110 returns, to the client device 106, the data object 116 that was previously stored therein.

The distributed storage system 110 further includes a metadata index 134 configured to map an object identifier (ID) 118 to physical storage. As discussed above, as more data objects 116 are stored in the distributed storage system 110, the metadata index 134 will continue to grow as physical storage mapping associated with object IDs continues to grow.

Figure 2:
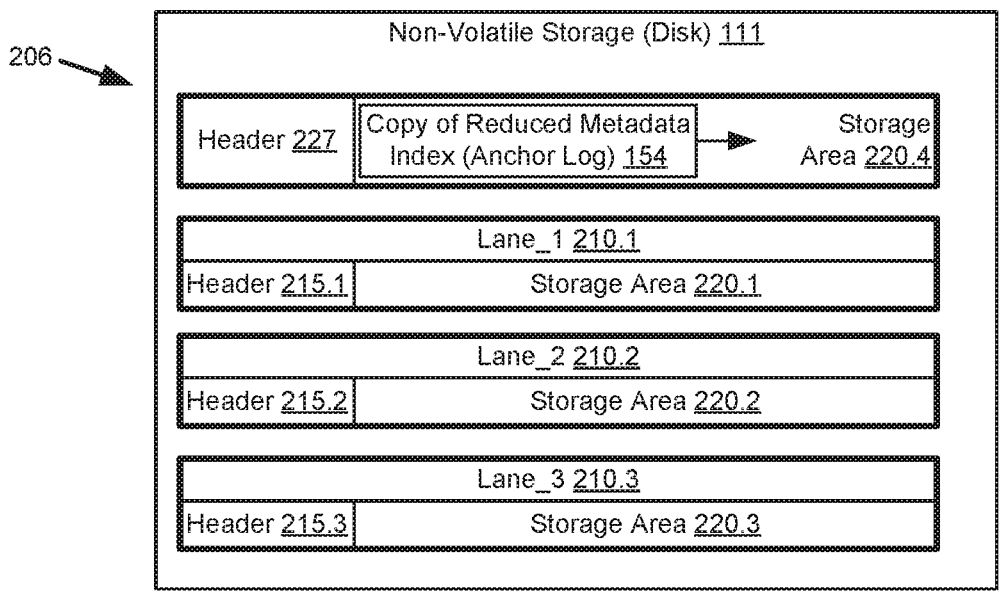
FIG. 2 illustrates an example partitioning of non-volatile storage into various lanes.

FIG. 2 illustrates a physical layout of non-volatile storage in the distributed storage system. Non-volatile storage (e.g., disk) 111 may be laid out according to a physical layout 206. The physical layout 206 may include one or more lanes 210 for storing the data objects 116. While one lane may be sufficient, the embodiment illustrated in FIG. 2 includes a plurality of lanes, namely three lanes 210.1, 210.2, 210.3. Each of the lanes 210 includes a header 215 identifying the lane and a payload or storage area 220. Furthermore, data objects 116 may be sequentially stored in the storage area 220 using an append-only configuration.

The layout 206 of the non-volatile storage 111 may coincide with the underlying storage architecture which may coincide with the multiple erase blocks or Shingled Magnetic Recording (SMR) zones in various storage media that include parallel or concentric architectures. The non-volatile storage 111 may further include a separate lane or storage area 220.4 which may also include a header 227 and may be used to non-volatilely store a copy of the metadata index 134, the reduction of which is further described herein.

The non-volatile storage 111 may include a header 227 and a storage area 220.4 were the portion of the metadata index 130 may be stored. The portion of the metadata index 134 that becomes the reduced metadata index 154 may also be known as an anchor log.

As stated, a copy of the disk metadata index (also known as the "anchor log") 154 may store at least a portion of metadata index 134. Metadata index 134 provides an index identifying storage locations within the non-volatile storage 111 when partitioned according to layout 206. Further, because the writing of the "anchor log" may occur to non-volatile storage having a limited quantity of write operations, the writing of the metadata index to the non-volatile storage may be less regularly stored (e.g., only after each of every 50, 000 write operations).

Figure 3:
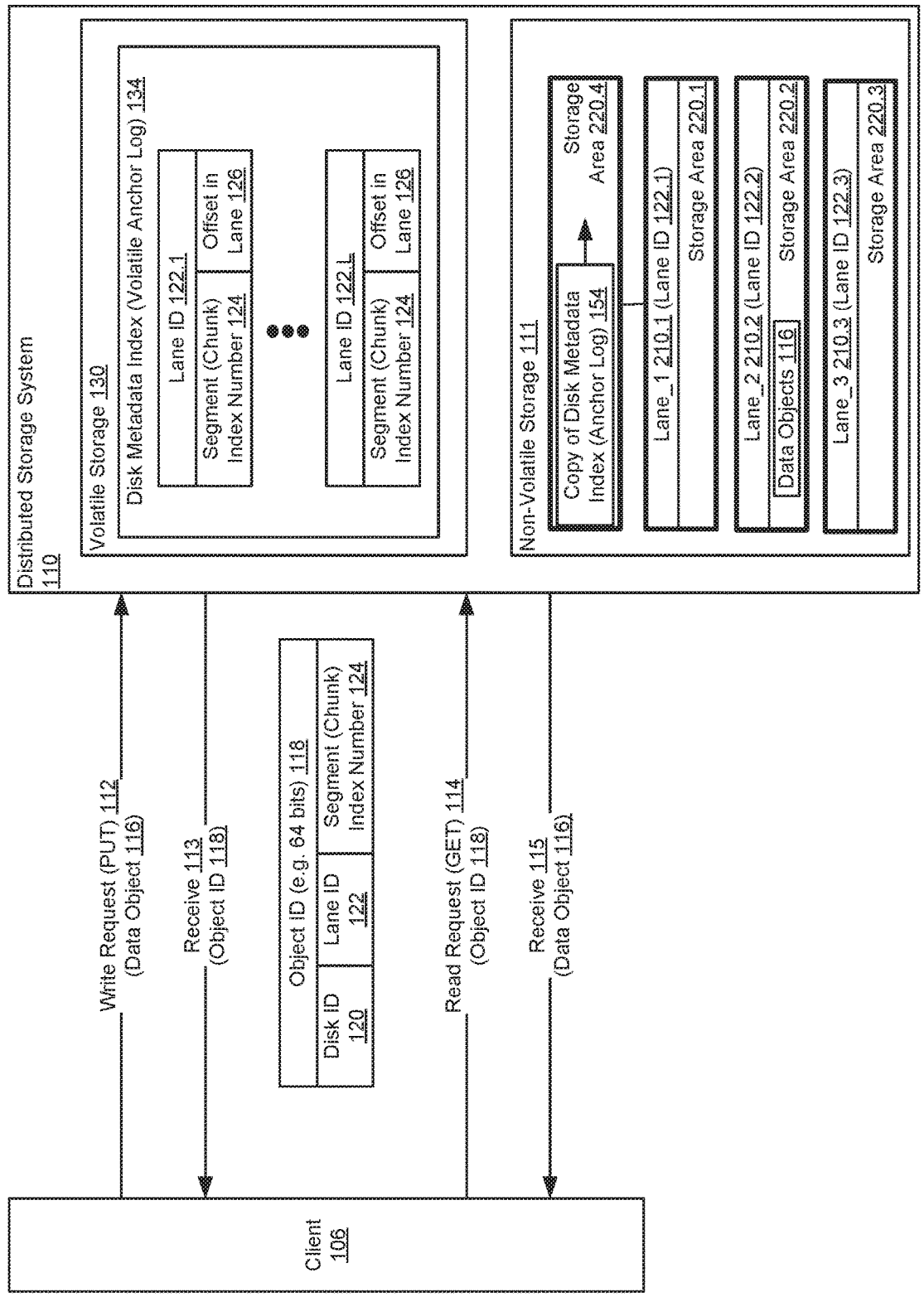
FIG. 3 illustrates an example interaction between a client and a distributed storage system.

FIG. 3 illustrates a more detailed diagram of system 100. As stated, the client device 106 interacts with the distributed storage system 110. Interaction may occur when a client device 106 issues a write request operation 112 including a data object 116. The distributed storage system 110 receives the write request including the data object and determines where to store the data object 116 in non-volatile storage 111. The distributed storage system 110 creates and manages a metadata index 134 which provides an index for accessing the data objects 116 stored in non-volatile storage 111.

As described above and as illustrated in FIG. 3, the non-volatile storage 111 is configured according to a layout 206 which may include a plurality of lanes 210 where a data object 116 may be stored. The location of the storage of data object 116 is maintained by metadata index 134. The metadata index 134 maintains a mapping of lane identifiers (IDs) 122 for each of the corresponding physical lanes 210 in non-volatile storage 111. The metadata index 134 further includes a segment index number 124 which corresponds to the sequentially incrementing, but not necessarily consecutive, segments in each of the lanes 210. Further, metadata index 134 associates and offset in the lane 126 with each segment index number 124. The offset in the lane 126 corresponds to a physical memory address within the lane 210 where the data object 116 is physically stored. As illustrated in FIG. 3, metadata index 134 illustrates a plurality of lanes 210 identified according to lane identifiers (IDs) 122.1-122.L.

As stated, each of the plurality of lanes may be configured for storing a plurality of segments (e.g., "chunks"). For example, a lane 210.1 may include increasing indexes, an example of which may be index_1, index_2, index_8, and index_11. Similarly, lane 210.2 may include increasing indexes, an example of which may be index_2, index_3, and index_5. Each segment may be associated with an increasing index number. The index number identifies the position of the segment in the lane, but is not related to the actual disc offset. Further, indexes may show gaps after deletion and different lanes may have the same index numbers repeated for that lane.

FIG. 4 illustrates further detail of the metadata index 134. For each of the corresponding lanes in the non-volatile storage 111, the metadata index 134 includes a respective index. For example, lane_1 210.1 of FIG. 2 and FIG. 3 includes a corresponding metadata index entry 402.1. Metadata index entry 402.1 includes a lane identifier (ID) 122.1, segment index number 124, and offset or offset in the lane 126. The lane identifier (ID) 122 corresponds to one of the plurality of lanes 210 and the segment index number 124 corresponds to an index number of a storage segment distributed along storage area 220. Because the data is appended along each of the storage areas 220, each appended segment is identified by an increasing segment index number 124. The segment index number 124 identifies the position of the data object in the storage area 220 of the lane 210, but the segment index number 124 is not related to the actual disc offset in the storage area 220. Instead, the offset or offset in the lane 126 provides a physical offset from a beginning of the lane to the actual segment of the lane that includes the specific data object.

Figure 5:
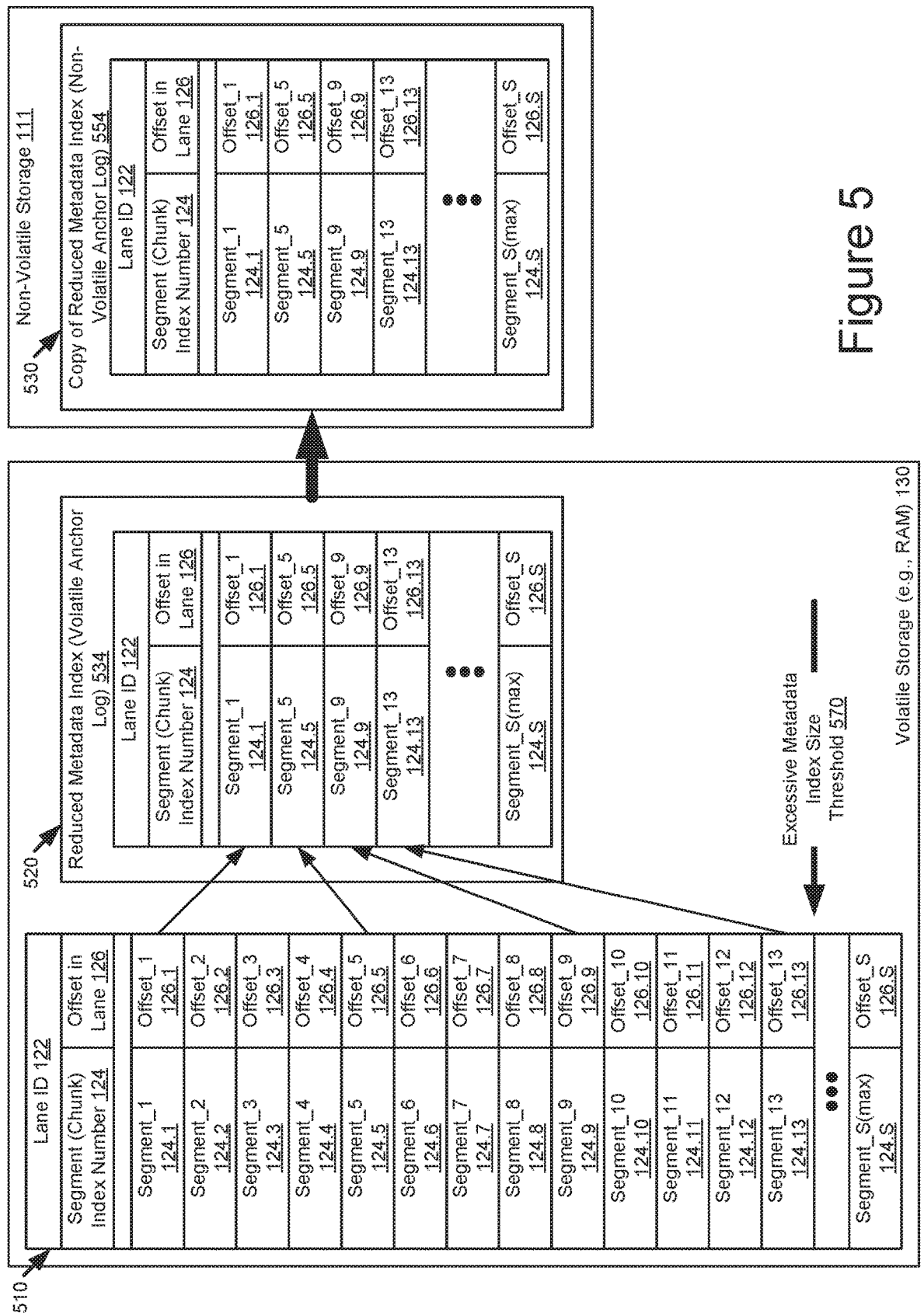
FIG. 5 illustrates an example disk metadata index having undergone a reduction in segment index numbers.

FIG. 5 illustrates a yet further detailed architecture for the management of the metadata index 134 described herein. In order to accommodate recovery from a device on power-up, the metadata index 134 may be copied and stored in non-volatile storage 111 as a copy of the metadata index.

In some embodiments, in subsequent iterations where the metadata index again satisfies an excessive metadata index size threshold, the system 110 (e.g., the metadata index processing module 830) may delete one or more of the plurality of segment index numbers. More particularly, as stated above, the various embodiments can manage the voluminous metadata index. By way of example, FIG. 5 illustrates three separate indexes. Index 510 illustrates a populated metadata index. That is to say, index 510 contains a segment index number 124 and offset 126 pair for each data object stored in the non-volatile storage 111. As further described above, storage of such a fully populated index becomes impractical as the size of the metadata index may consume the available non-volatile memory. Accordingly, the various aspects described herein reduce or prune a fully populated metadata index down to a manageable size. The pruning or reduction occurs when the size of the metadata index satisfies (e.g., exceeds, meets, etc.) an excessive metadata index size threshold 570. The threshold 570 may be managed according to various factors including the available non-volatile resources in the specific system that may be allocated for storing the metadata index.

The index 520 illustrates a reduced (pruned) metadata index, illustrated as reduced metadata index 534. Generation of reduced metadata index 534 is accomplished by performing a pruning or reduction algorithm on index 510. The pruning algorithm may include the deletion of certain ones of the segment index number and offset pairs. By way of example and not limitation, ones of the pairs may be deleted based upon their even or odd index numbering. Further, ones of the pairs may be deleted based upon other factors such as deletion of all but every third, fourth, etc. pair. Yet further, other factors for selecting ones of the pairs to delete may include the length of the offsets, the size of the data objects, or other factors.

By way of example, FIG. 5 illustrates the pruning of three of every four pair within the fully populated metadata index 510. Accordingly, the remaining segment index number and offset pairs include, for example, segment 124.1 and offset 126.1, segment 124.5 and offset 126.5, segment 124.9 and offset 126.9, and segment 124.13 and offset 126.13 are retained, as illustrated in index 520. Accordingly, after the pruning of the metadata index, not all pairs remain represented in the reduced metadata index 534 and a reduction of 75% in the size of the metadata index may be obtained. The reduced (pruned) index 520 may then become the reduced metadata index 534 with the remaining metadata index pairs therein being known, for example, as "anchors" listed in the reduced metadata index 534.

As the reduced metadata index 534 increases in size, the excessive metadata index size threshold 570 may be applied to the reduced metadata index 534 to engage in continuous pruning of the metadata index.

FIG. 5 also illustrates the non-volatile storage of the reduced metadata index 534 as a copy of the reduced metadata index 554 stored in non-volatile storage 111. As stated above, non-volatile storage of the reduced metadata index enables recovery during volatile memory loss such as during startup or power interrupt conditions.

Figure 6:
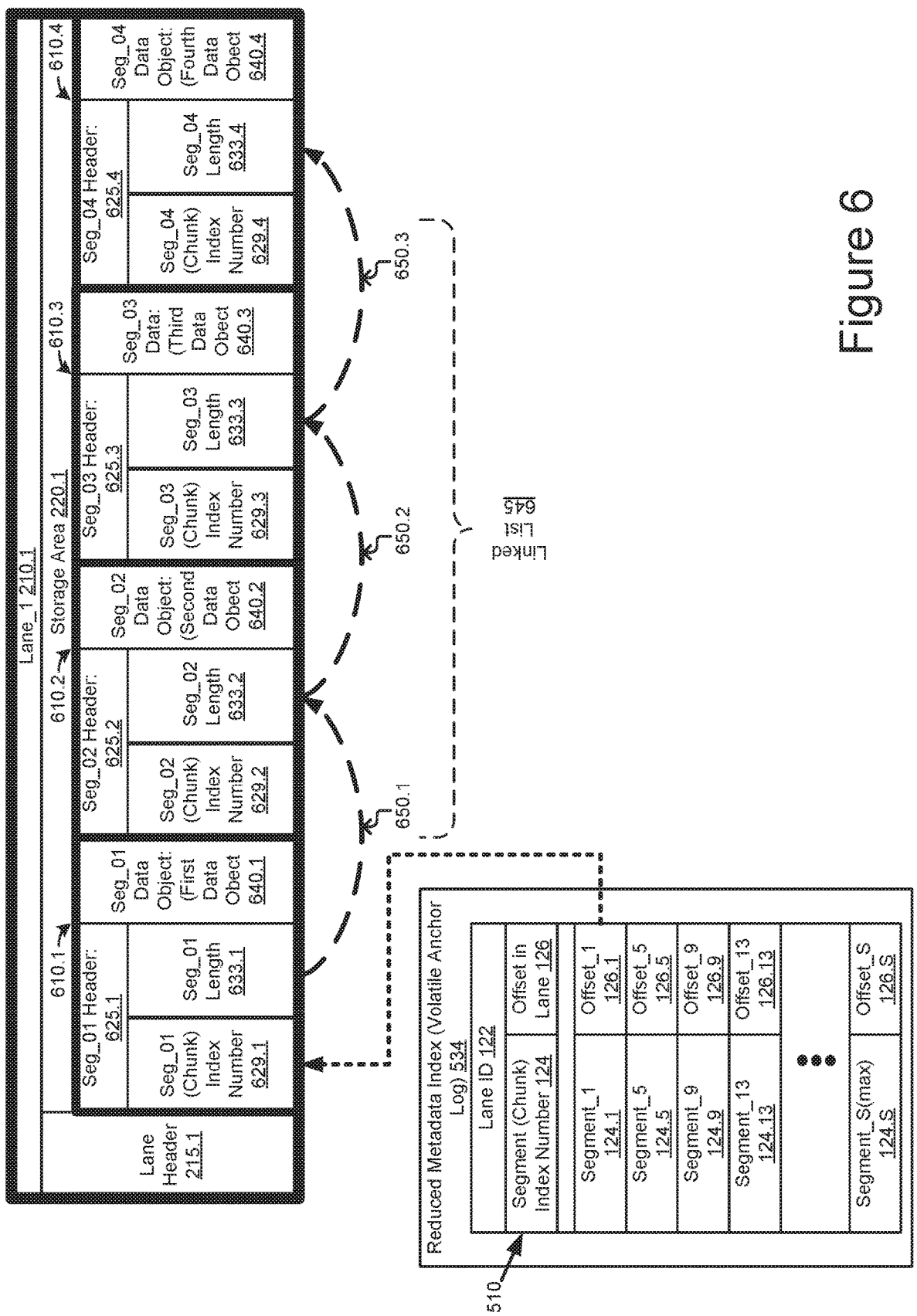
FIG. 6 illustrates an example for locating a data object corresponding to a segment index number that has been deleted from the metadata index.

FIG. 6 is a diagram illustrating addressing of a specific data object utilizing a reduced metadata index. By way of example, a lane 210.1 includes a lane header 215.1 and a storage area 220.1. The storage area 220.1 may include segments 610.1, 610.2, 610.3, and 610.4. Each of the segments 610 includes a segment header 625 and a data object 640. Further, segment header 625 includes a segment index number 629 and a segment length 633.

Also illustrated in FIG. 6 is a linked list 645 comprised of a first link 650.1, a second link 650.2, and third link 650.3. The linked list 645 and links 650 are illustrative and are formed by each of the segment length 633. The size of the linked list and the number of links is purely illustrative and will vary upon the extent of the pruning that occurred to generate the reduced metadata index 534.

Reduced metadata index 534 includes a lane identifier (ID) 122 which includes a segment index number 124 and an offset in the lane 126. Reduced metadata index 534 corresponds to the reduced metadata index 534 of FIG. 5 where one out of four indexes 510 were retained in the reduced metadata index 534.

In operation, the distributed storage system 110 receives a read request operation 114 including an object identifier (ID) 118 from a client device 106. The distributed storage system 110 then processes the index 510 including the segment index number 124 offset 126 to determine a location of the requested data object. By way of example, if the requested data object is data object 640.1, and the index 510 is directly resident in the reduced metadata index 534 as segment 124.1 and offset 126.1, then, by knowing the segment and the offset with respect to a beginning of the lane 210.1, the first data object 640.1 is directly addressable and therefore directly retrievable from the information remaining in the reduced metadata index 534.

If the index 510 received from the client device 106 is for the fourth data object 640.4, then the distributed storage system processes the index 510 and looks for the corresponding segment index_4 in the reduced metadata index 534. However, because the segment index number_4 for segment_4 was deleted in a previous metadata index reduction process, the distributed storage system looks for the next lower segment index number resident in the reduced metadata index 534. The next lowest segment index number resident in the reduced metadata index 534 is the segment index number_1 124.1 corresponding to segment index_1. Accordingly, the distributed storage system uses the index for segment_1 to identify a physical addressable location in storage area 220.1 and then compares the segment index number therein for a match with the requested segment index number. Accordingly, the requested segment index number does not match the resident segment index number in the request received from the client device. Accordingly, the distributed storage system identifies the segment length_1 633.1 associated with the segment index number 629.1 and uses the segment length 633.1 as a link 650.1 to 'jump' to the next segment without having to sequentially traverse the length of the first data object 640.1 in search of an end of object indicator.

Thereafter, when the addressing is linked to the second segment 610.2 by link 650.1, the distributed storage system compares the segment index number 629.2 with the segment index number received in the request and determines that there is still not a match in the segment index numbers. Accordingly, the distributed storage system repeats the process by using the segment length 633.2 as a link 650.2 to 'jump' past the second data object 640.2 and arrive at the third segment 610.3. The process then compares the segment index number 629.3 with the segment index number received in the request and again determines that the segment index numbers do not match.

Yet again, the distributed storage system repeats the process by using the segment length 633.3 as a link 650.3 to 'jump' past the third data object 640.3 and arrive at the fourth segment 610.4. The process then compares the segment index number 629.4 with the segment index number received in the request and determines that the segment index numbers do match. The process then retrieves the requested fourth data object 640.4 from the storage area 220.1 of the non-volatile storage 111 and returns the fourth data object 640.4 in the receive operation 115 in response to the read request operation 114.

It should be noted that the retrieval of data objects, as described above, that do not include indexes in the reduced metadata index 534, require minimal additional steps to identify and retrieve the data objects since the segments in the lane may be traversed as a linked list 645 without requiring a sequential read of each of the bits of the intervening segments.

Figure 7A:
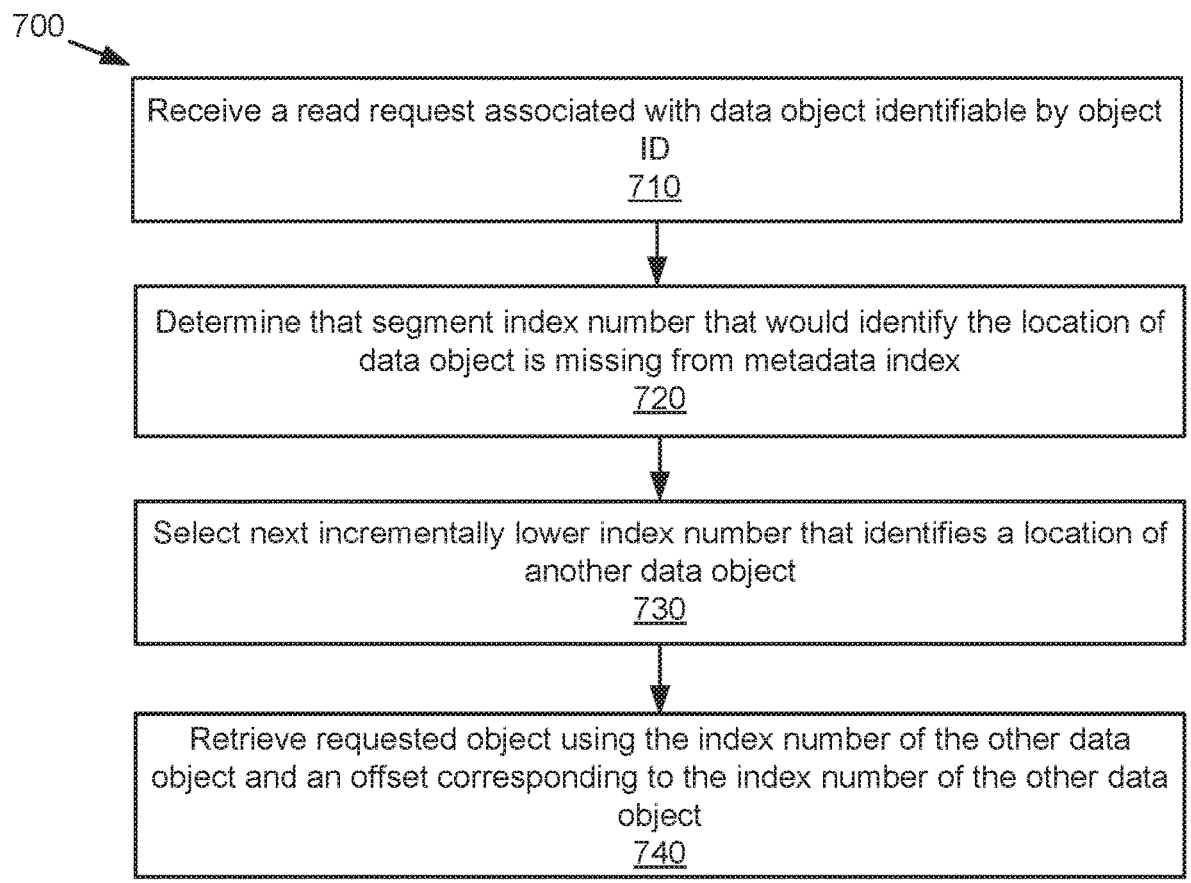
FIGS. 7A and 7B illustrate a method for controlling the size of the disk metadata index stored in volatile memory.

FIG. 7A illustrates a method for retrieving data objects using a reduced metadata index in a distributed storage system.

In block 710, a read request is received in a distributed storage system associated with a second data object stored by the distributed storage system, where the second data object is identifiable by a second object identifier. The distributed storage system includes a first data object and a second data object identified by respective a first object identifiers and a second object identifier and stored in respective a first segment and a second segment of a plurality of segments of an append-only storage area of the distributed storage system. The first segment and the second segment respectively identified by a first segment index number and a second segment index number of a plurality of segment index numbers sequentially identify respective sequential ones of the plurality of segments of the append-only storage area of a distributed storage system. The first segment index number is sequentially less than the second segment index number, the read request including the second object identifier including the second segment index number.

In block 720, the distributed storage system determines that a second segment index number that would identify a location of the second data object in the distributed storage system is absent from a metadata index of the distributed storage system. The distributed storage system. The distributed storage system indexes a metadata index of the distributed storage system. The metadata index includes a plurality of offsets associated with the respective plurality of segment index numbers, where the metadata index includes the first segment index number identifying a location of the first data object, and excludes the second segment index number identifying a location of the second data object.

In block 730, the distributed storage system, in response to determining that the second segment index number is absent from the metadata index, selects incrementally lower index included in the metadata index, where the incrementally lower index is a first segment index number that identifies a location of the first data object in the distributed storage system.

In block 740, the distributed storage system retrieves the second data object from the distributed storage system using the first segment index number and a first offset corresponding to the first segment index number.

Figure 7B:
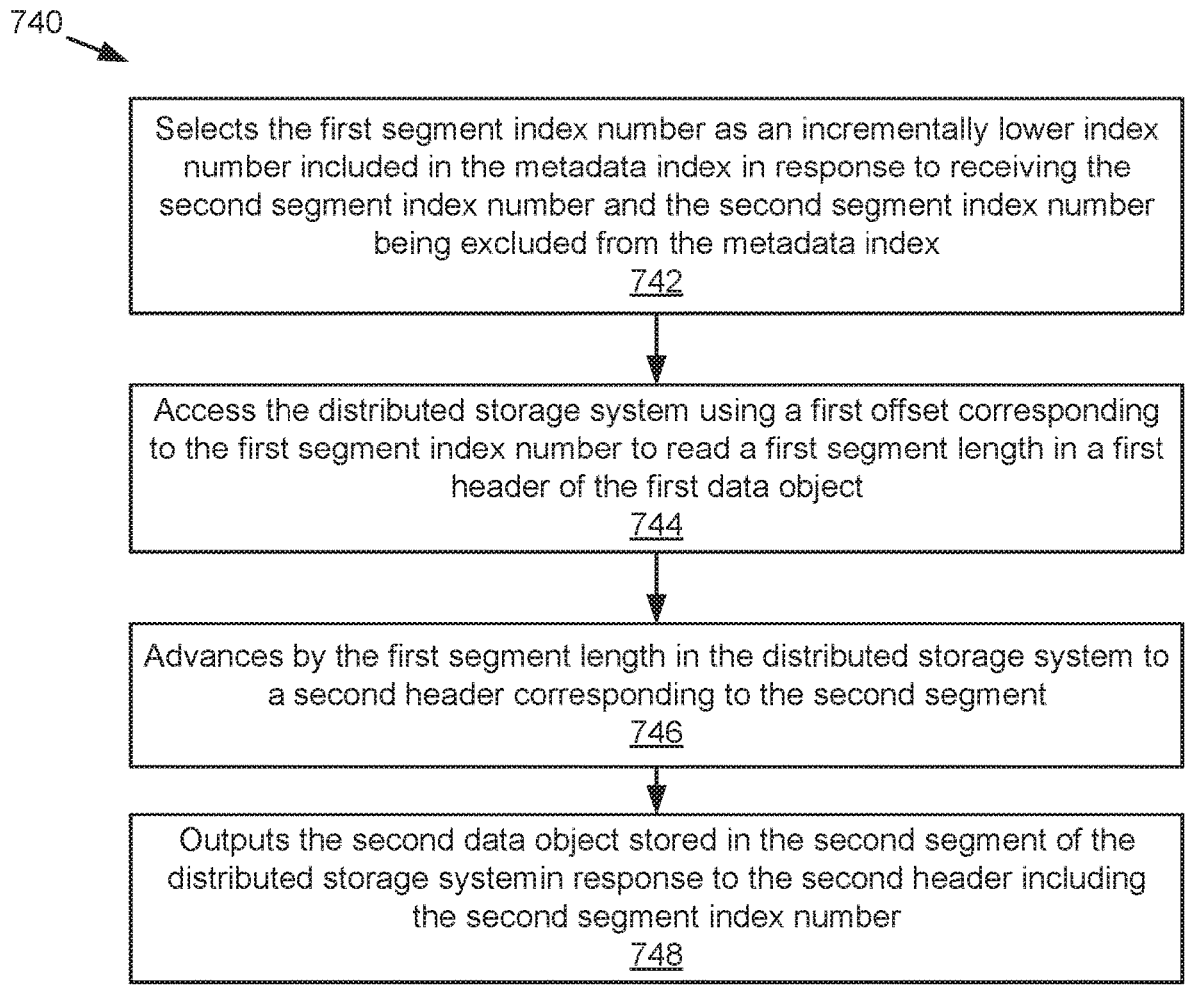

FIG. 7B further illustrates further blocks for retrieving the second data object from the distributed storage system using the first segment index number and a first offset corresponding to the first segment index number.

In block 742, the distributed storage system in response to receiving the second segment index number and the second segment index number is excluded from the metadata index, selects the first segment index number as an incrementally lower index number included in the metadata index. To improve searching efficiency, the first segment index number may be the next incrementally lower index number included in the metadata index.

In block 744, the distributed storage system begins to retrieve the second data object from the distributed storage system by accessing the distributed storage system using a first offset corresponding to the first segment index number to read a first segment length in a first header of the first data object.

In a block 746, the distributed storage system advances by the first segment length in the distributed storage system to a second header corresponding to the second segment.

In block 748, the distributed storage system, in response to the second header including the second segment index number, outputs the second data object stored in the second segment of the distributed storage system.

Figure 8:
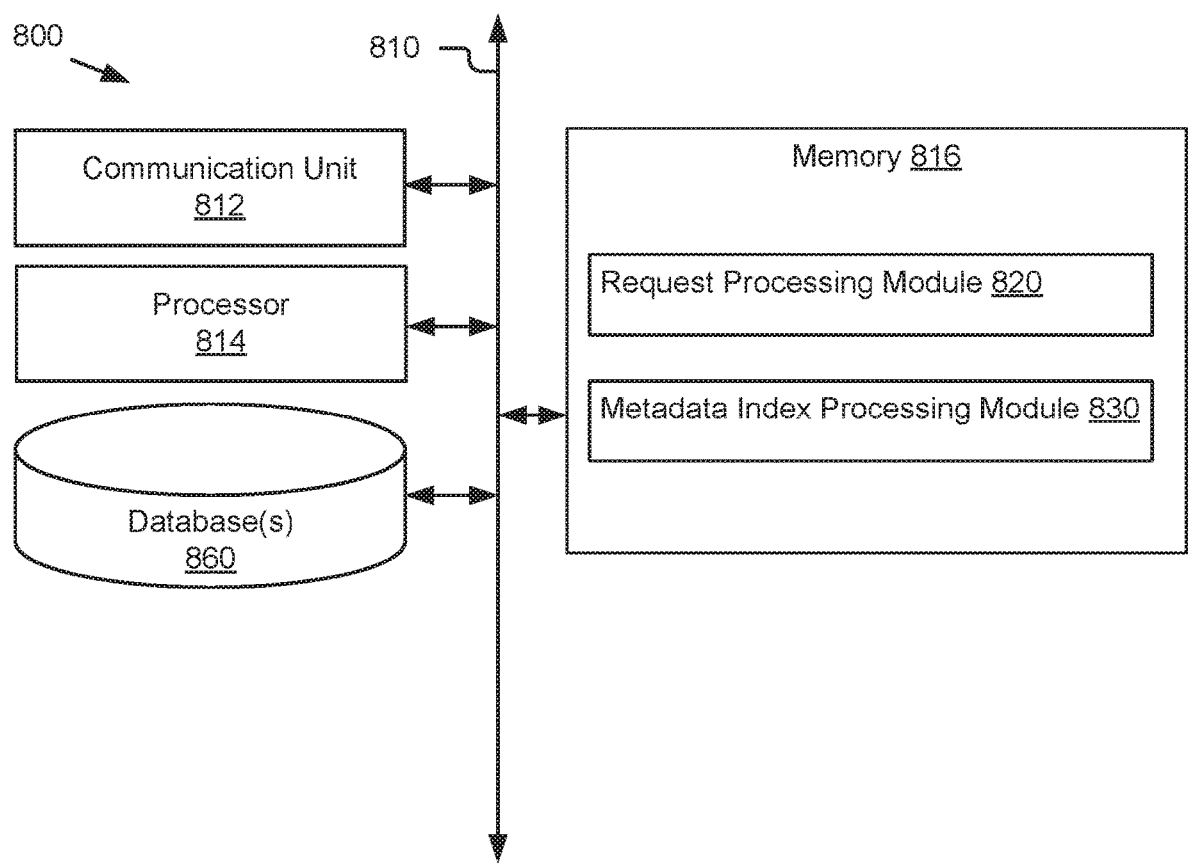
FIG. 8 illustrates a system configured to manage a disk metadata index and retrieve requested data objects.

FIG. 8 is a diagram of a distributed storage system configured to index data objects using a reduced metadata index. Accordingly, there is made use of an anchor store concept which reduces the size of the metadata index in volatile storage or RAM. The concept is developed for storage nodes making use of storage devices based on Flash, SMR, and PMR. One solution is to cache or store the metadata index in RAM but such an approach is not feasible in such large-scale storage systems as the size of the metadata index could grow to for example over 25 TB, which can no longer be handled in RAM.

The distributed storage system 800 may include a bus 810 interconnecting at least one communication unit 812, at least one processor 814, and at least one memory 816. Bus 810 may include one or more conductors that permit communication among the components of the distributed storage system 800. Communication unit 812 may include any transceiver-like mechanism that enables distributed storage system 800 to communicate with other devices and/or systems. For example, communication unit 812 may include wired or wireless mechanisms for communicating with the client device 106 via a network 140. Processor 814 may include any type of processor or microprocessor that interprets and executes instructions. Memory 816 may include a random access memory (RAM) or another type of dynamic storage device that stores information and instructions for execution by processor 814 and/or a read-only memory (ROM) or another type of static storage device that stores static information and instructions for use by processor 814 and/or any suitable storage element such as a hard disk or a solid-state storage element.

Distributed storage system 800 may include or have access to one or more databases 860 which may include one or more data structures or records for non-volatilely storing data objects 116 and a copy of the reduced metadata index 554.

Distributed storage system 800 may include a plurality of modules or subsystems that are stored and/or instantiated in memory 816 for execution by processor 814. For example, memory 816 may include a means for or a request processing module 820 configured to receive a read request in the distributed storage system. Further, the request processing module configured to receive a read request in a distributed storage system associated with a second data object stored by the distributed storage system, where the second data object is identifiable by a second object identifier. The distributed storage system includes a first data object and a second data object identified by a respective first object identifier and second object identifier and stored in the respective first segment and second segment of a plurality of segments of an append-only storage area of the distributed storage system.

Further, the first segment and the second segment respectively identified by a first segment index number and a second segment index number of a plurality of segment index numbers that sequentially identify respective sequential ones of the plurality of segments of the append-only storage area of a distributed storage system. Yet further, the first segment index number is sequentially less than the second segment index number, and the read request includes the second object identifier including the second segment index number. The request processing module 820 is further configured to, in response to the second header including the second segment index number, output the second data object stored in the second segment of the distributed storage system.

The memory 816 may further include a means for or a metadata index processing module 830 configured to determine that a second segment index number that would identify a location of the second data object in the distributed storage system is absent from a metadata index of the distributed storage system, Further, the metadata index processing module configured to access a metadata index of the distributed storage system, the metadata index including a plurality of offsets associated with the respective plurality of segment index numbers, where the metadata index includes the first segment index number identifying a location of the first data object, and excluding the second segment index number identifying a location of the second data object.

The metadata index processing module 830 may be further configured to select an incrementally lower index included in the metadata index, where the incrementally lower index is a first segment index number that identifies a location of the first data object in the distributed storage system, in response to receiving the second segment index number and the second segment index number is excluded from the metadata index. The metadata index processing module 830 may be yet further configured to retrieve the second data object from the distributed storage system by accessing the distributed storage system using a first offset corresponding to the first segment index number to read a first segment length in a first header of the first data object. The metadata index processing module 830 is yet further configured to advance by the first segment length in the distributed storage system to a second header corresponding to the second segment.

In other embodiments, the request processing module 820 may be configured to store the first data object and the second data object in the first segment and the second segment, respectively, generate the first object identifier and the second object identifier to allow identification of the respective first data object and the second data object in the distributed storage system, where the first object identifier and the second object identifier respectively include the first header and the second header further including the respective first segment index number and the second segment index number, and generate the metadata index including the first segment index number and the second segment index number respectively associated with a first offset and a second offset, where the first offset and the second offset designating a respective first distance and a second distance from a beginning of the append-only storage area to a respective beginning of the first segment and the second segment in the append-only storage area.

In other embodiments, the metadata index processing module 830 may be configured to, in response to the metadata index exceeding an excessive metadata index size threshold, delete the second segment index number and the second offset from the metadata index. Further, the metadata index processing module 830 may be configured to delete the second segment index number and the second offset from the metadata index, and may be configured to select the segment index numbers and offsets to delete based on selecting one of even or odd-numbered segment index numbers, and select ones where the segment index numbers are segment index numbers indexed as a power of two. Further, the metadata index processing module may be further configured to store a copy of the metadata index in a metadata storage area of the distributed storage system.

In yet further embodiments, the distributed storage system may be configured where the storage area of the distributed storage system comprises a plurality of lanes, each of the plurality of lanes includes a plurality of segments of an append-only storage area of the distributed storage system, the plurality of segments in each of the plurality of lanes is identified by a respective plurality of segment index numbers sequentially identifying sequential ones of the plurality of segments of the append-only storage area of a distributed storage system. Further, each of the first header and the second header further includes a lane identifier identifying one of the plurality of lanes.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. The computer code may execute on a user's computing device, partly on a user's computing device, as a stand-alone software package, partly on a user's computing device and partly on a remote computing device, or on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, is implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, is implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A method, comprising:
 receiving a read request in a distributed storage system associated with a second data object stored by the distributed storage system, wherein the second data object is identifiable by a second object identifier;
 determining that a second segment index number that would identify a location of the second data object in a storage area of the distributed storage system is absent from a metadata index of the distributed storage system; and
 in response to determining that the second segment index number is absent from the metadata index:
  selecting an incrementally lower index included in the metadata index, wherein the incrementally lower index is a first segment index number that identifies a location of a first data object in the storage area of the distributed storage system;
  reading a first segment length in a first header of the first data object;
  advancing, by the first segment length in the distributed storage system, to a second header corresponding to the second segment; and
  in response to the second header including the second segment index number, retrieving the second data object from the distributed storage system without adding the second segment index number to the metadata index.

2. The method of claim 1, wherein:
 the distributed storage system includes the first data object and the second data object identified by a first object identifier and the second object identifier;
 the first object identifier and the second object identifier are respectively stored in a first segment and a second segment of a plurality of segments of an append-only storage area of the distributed storage system;
 the first segment and the second segment are respectively identified by the first segment index number and the second segment index number of a plurality of segment index numbers sequentially identifying respective sequential segments of the plurality of segments of the append-only storage area of the distributed storage system; and
 the first segment index number is sequentially less than the second segment index number.

3. The method of claim 2, wherein determining that the second segment index number is absent from the metadata index further comprises:
 accessing the metadata index of the distributed storage system, wherein:
  the metadata index includes a plurality of offsets associated with the plurality of segment index numbers, respectively;
  the metadata index includes the first segment index number; and
  the first segment index number:
   identifies a location of the first data object; and
   excludes the second segment index number identifying a location of the second data object.

4. The method of claim 3, wherein:
 reading the first segment length includes accessing the distributed storage system using a first offset corresponding to the first segment index number to read the first segment length; and
 advancing to the second header corresponding to the second segment includes:
  advancing by the first segment length to at least one intermediate segment to read at least one intermediate segment length in at least one intermediate header for at least one intermediate data object; and
  advancing by the at least one intermediate segment length to arrive at the second header.

5. The method of claim 1, wherein:
 the storage area of the distributed storage system comprises a plurality of lanes;
 each lane of the plurality of lanes includes a plurality of segments of an append-only storage area of the distributed storage system; and
 the plurality of segments in each lane of the plurality of lanes is respectively identified by a plurality of segment index numbers sequentially identifying sequential segments of the plurality of segments of the append-only storage area of the distributed storage system.

6. The method of claim 5, wherein each of the first data object and the second data object further includes a lane identifier identifying one lane of the plurality of lanes.

7. The method of claim 5, further comprising:
 storing the first data object and the second data object in a first segment and a second segment, respectively;
 generating a first object identifier and the second object identifier to enable a respective identification of the first data object and the second data object in the distributed storage system, wherein:
  the first object identifier and the second object identifier respectively include a first header and a second header; and
  the first header and the second header respectively include the first segment index number and the second segment index number;
 generating, at a first time, the metadata index including the first segment index number and the second segment index number respectively associated with the first offset and a second offset, wherein:
  the first offset designates a first distance from a beginning of the storage area to a beginning of the first segment in the storage area; and
  the second offset designates a second distance from a beginning of the storage area to a beginning of the second segment in the storage area; and
 in response to the metadata index satisfying an excessive metadata index size threshold at a second time, performing a pruning algorithm to delete a plurality of metadata index pairs including segment index numbers and corresponding offsets from the metadata index, wherein the plurality of metadata index pairs includes the second segment index number and the second offset from the metadata index.

8. The method of claim 7, wherein:
performing the pruning algorithm comprises:
selecting an integer factor greater than one; and
deleting the plurality of metadata index pairs corresponding to all segment index numbers of the plurality of segment index numbers except every Xth segment index number;
X is the integer factor; and
the first segment index number is not in the plurality of metadata index pairs.

9. The method of claim 7, further comprising:
in subsequent iterations where the metadata index again satisfies the excessive metadata index size threshold, deleting one or more of the plurality of segment index numbers.

10. The method of claim 1, wherein a copy of the metadata index is stored in a metadata storage area of the distributed storage system.

11. A distributed storage system, comprising:
a processor;
a memory;
a request processing module, stored in the memory for execution by the processor, configured to receive a read request associated with a second data object stored by a distributed storage system, wherein the second data object is identifiable by a second object identifier; and
a metadata index processing module, stored in the memory for execution by the processor, configured to:
determine that a second segment index number that would identify a location of the second data object in a storage area of the distributed storage system is absent from a metadata index of the distributed storage system; and
in response to determining that the second segment index number is absent from the metadata index:
select an incrementally lower index included in the metadata index, wherein the incrementally lower index is a first segment index number that identifies a location of a first data object in the storage area of the distributed storage system;
read a first segment length in a first header of the first data object;
advance, by the first segment length in the distributed storage system, to a second header corresponding to the second segment; and
in response to the second header including the second segment index number, retrieve the second data object from the distributed storage system without adding the second segment index number to the metadata index.

12. The distributed storage system of claim 11, wherein:
the distributed storage system includes the first data object and the second data object identified by a first object identifier and the second object identifier;
the first object identifier and the second object identifier are respectively stored in a first segment and a second segment of a plurality of segments of an append-only storage area of the distributed storage system;
the first segment and the second segment are respectively identified by the first segment index number and the second segment index number of a plurality of segment index numbers sequentially identifying respective sequential segments of the plurality of segments of the append-only storage area of the distributed storage system; and
the first segment index number is sequentially less than the second segment index number.

13. The distributed storage system of claim 12, wherein the metadata index processing module is further configured to:
access the metadata index of the distributed storage system, wherein:
the metadata index includes a plurality of offsets associated with the plurality of segment index numbers, respectively;
the metadata index includes the first segment index number; and
the first segment index number:
identifies a location of the first data object; and
excludes the second segment index number identifying a location of the second data object.

14. The distributed storage system of claim 11, wherein:
the storage area of the distributed storage system comprises a plurality of lanes;
each lane of the plurality of lanes includes a plurality of segments of an append-only storage area of the distributed storage system; and
the plurality of segments in each of the plurality of lanes is respectively identified by a plurality of segment index numbers sequentially identifying sequential segments of the plurality of segments of the append-only storage area of the distributed storage system.

15. The distributed storage system of claim 14, wherein each of the first data object and the second data object further includes a lane identifier identifying one lane of the plurality of lanes.

16. The distributed storage system of claim 14, wherein:
the request processing module is further configured to:
store the first data object and the second data object in a first segment and a second segment, respectively;
generate a first object identifier and the second object identifier to enable a respective identification of the first data object and the second data object in the distributed storage system, wherein:
the first object identifier and the second object identifier respectively include a first header and a second header; and
the first header and the second header respectively include the first segment index number and the second segment index number; and
generate, at a first time, the metadata index including the first segment index number and the second segment index number respectively associated with the first offset and a second offset, wherein:
the first offset designates a first distance from a beginning of the storage area to a beginning of the first segment in the storage area; and
the second offset designates a second distance from a beginning of the storage area to a beginning of the second segment in the storage area; and
the metadata index processing module is further configured to:
in response to the metadata index satisfying an excessive metadata index size threshold at second time, perform a pruning algorithm to delete a plurality of metadata index pairs including segment index numbers and corresponding offsets from the metadata index, wherein the plurality of metadata index pairs includes the second segment index number and the second offset from the metadata index.

17. The distributed storage system of claim 16, wherein:
performing the pruning algorithm comprises:
selecting an integer factor greater than one; and deleting the plurality of metadata index pairs corresponding to all segment index numbers of the plurality of segment index numbers except every Xth segment index number;

X is the integer factor; and the first segment index number is not in the plurality of metadata index pairs.

18. The distributed storage system of claim 16, wherein the metadata index processing module is further configured to, in subsequent iterations where the metadata index again satisfies the excessive metadata index size threshold, delete one or more of the plurality of segment index numbers.

19. The distributed storage system of claim 16, wherein the metadata index processing module is further configured to store a copy of the metadata index in a metadata storage area of the distributed storage system.

20. A distributed storage system, comprising:

means for receiving a read request in a distributed storage system associated with a second data object stored by distributed storage system, wherein the second data object is identifiable by a second object identifier;

means for determining that a second segment index number that would identify a location of the second data object in a storage area of the distributed storage system is absent from a metadata index of the distributed storage system;

means for, in response to determining that the second segment index number is absent from the metadata index:

selecting an incrementally lower index included in the metadata index, wherein the incrementally lower index is a first segment index number that identifies a location of a first data object in the storage area of the distributed storage system;

reading a first segment length in a first header of the first data object;

advancing, by the first segment length in the distributed storage system, to a second header corresponding to the second segment; and in response to the second header including the second segment index number, retrieving the second data object from the distributed storage system without adding the second segment index number to the metadata index.

* * * * *